United States Patent [19]

Buelens et al.

[11] Patent Number: 4,901,936
[45] Date of Patent: Feb. 20, 1990

[54] CORE FOR FILM SPOOL

[75] Inventors: Edward Buelens, Kontich; Roger F. De Smedt, Tielrode; Wilfried E. Muylle, Schoten, all of Belgium

[73] Assignee: Agfa-Gevaert N.V., Mortsel, Belgium

[21] Appl. No.: 277,646

[22] Filed: Nov. 29, 1988

[30] Foreign Application Priority Data

Dec. 10, 1987 [EP] European Pat. Off. ........ 87202471.6

[51] Int. Cl.⁴ .............................................. G03B 21/32
[52] U.S. Cl. .................................. 242/74.1; 242/125.1
[58] Field of Search ....................... 242/74, 74.1, 74.2, 242/125.1

[56] References Cited

U.S. PATENT DOCUMENTS 3,361,380 1/1968 Mizutani ............................... 242/74
4,506,843 3/1985 Luhrig et al. .......................... 242/74
4,750,683 6/1988 Schoettle et al. .................... 242/74.1
4,809,923 3/1989 Adriaensen et al. ........... 242/74.1 X

FOREIGN PATENT DOCUMENTS 2325188 11/1973 Fed. Rep. of Germany .

Primary Examiner—Stuart S. Levy
Assistant Examiner—Steven M. duBois
Attorney, Agent, or Firm—William J. Daniel

[57] ABSTRACT

A cylindrical core 1 for receiving windings of a photographic film web comprises a hub 3 having an axial re-entrant channel and an insert 4 fitting into and engaging shoulders 13, 16 of that channel to define with the channel a slot 26 for receiving an end of a film web 2. Cooperating detent elements 19, 25 are provided for resisting relative axial movement between the hub 3 and the insert 4 when the latter is inserted into the channel 11, and the insert 4 incorporates teeth 24 for engaging at least one marginal perforation of a film web to prevent circumferential slippage of the film web. The slot 26 is inclined obliquely from a radial direction, and the teeth 24 are located on the inner or lower wall thereof so that the film perforations are released from the teeth when the film end is tensioned at the end of unwinding.

13 Claims, 2 Drawing Sheets

CORE FOR FILM SPOOL

BACKGROUND OF THE INVENTION

1. Field of the Invention

This invention relates to a cylindrical core for receiving windings of a photographic film web and comprising an opening for receiving an end of the film web and means for resisting circumferential slippage of a wound film web over the core.

2. Description of the Prior Art

Spools of photographic film for cinematographic use are wound onto cylindrical cores for ease of handling.

It has been known for very many years to provide means for resisting circumferential slippage of a wound film web over the core. Such proposals include leading an end of the film web through a slot in the core and clamping it, with or without the use of projections which interengage with the perforations provided in the margins of the film web. It has also been proposed to provide such projections around the periphery of the winding core, whether in fixed relation thereto or carried by a flexible strap wound round the core. Examples of some of the many known constructions are set forth in Patent Specifications Nos GB 637,371, U.S. Pat. No. 3,331,564, U.S. Pat. No. 3,315,911, FR 1,044,194, FR 1,467,511, FR 1,488,581, DE 1,201,679 and in German Federal Republic Utility Models Nos Gbm 1,823,629 and Gbm 1,963,688. Known cores having means for resisting slippage of a wound film web tend to be of rather complicated construction and they are therefore rather expensive and thus unsuitable for use when supplying unused film stock to the cinematographer. Also, many such constructions tend to resist release of the end of a film web on complete unwinding from the core.

This perhaps explains why currently used cores simply have a slot for receiving the end of a film web which is then wound onto the core. Using such cores, the film is held in place by friction, and there is no positive interengagement between the film and the core, so that the film can be released easily on complete unwinding. This is satisfactory when the film web is coated with a hard emulsion, but it gives rise to problems when the emulsion is relatively soft because slippage tends to occur when the film web is under tension and there are only a few windings on the core. As a result, an end portion of the film web may be susceptible to damage. It would of course be possible to make use of a film web bearing a harder emulsion, but this is not always compatible with high photographic quality.

Such currently used cores are generally formed as integral mouldings of plastics material, and because of their construction, they require a moulding die of at least three, and usually four or more parts. It would certainly be possible to form such a core with integral means for resisting slippage of a wound film web, but this would require a more complicated mould which would therefore be very expensive to manufacture. Such a complicated mould would also tend to have a relatively short working life.

SUMMARY OF THE INVENTION

Objects of the invention

It is an object of this invention to provide a cylindrical core for receiving windings of a photographic film web comprising an opening for receiving an end of the film web and means for resisting circumferential slippage of a wound film web over the core which is of simple and inexpensive construction.

Statement of the invention

According to this invention, there is provided a cylindrical core for receiving windings of a photographic film web and comprising an opening for receiving an end of the film web and means for resisting circumferential slippage of a wound film web over the core, characterised in that the core comprises a hub having an axial re-entrant channel, an insert fitting into said channel and engaging the re-entrant thereof to define with the channel a slot for receiving an end of a film web, means for resisting relative axial movement between the hub and the insert when the latter is inserted into said channel, the insert incorporating means for engaging at least one marginal perforation of a said film web to prevent circumferential slippage of the film web and being disposed so as to disengage from the film web when the latter is radial of the core on unwinding.

Such a core can be of simple construction and therefore quite inexpensive to produce. It provides a positive anchorage of the end of the film web while ensuring that the film end is automatically released from the core at the end of the unwinding of the film.

The hub of a said core may be, and preferably is produced as an integral plastic moulding, this being the easiest and least expensive way of producing it.

The moulding operation is simplified when, as is preferred, said hub is free from undercuts in opposed axial mould-release directions.

The hub can be moulded using a two-piece moulding die which opens and closes according to the axial direction of the hub and which can accordingly be of simple and rugged construction and therefore relatively inexpensive and long-lasting.

An axially opening two-piece moulding die may show the disadvantage that a very tiny circular flashing-like bead may be produced on the outer cylindrical periphery of the hub at the junction of the mold pieces, usually halfway of its length. This bead is caused by an insufficient closure of both moulding dies. In the case of very good finished dies, the bead may become almost disappear, except for some places where yet a breakthrough of the moulded plastic occurs in the form of minuscule dots spaced along an imaginary circle on the outer surface of the hub. These dots, or a continuous peripheral bead as the case may be, may damage the first windings of a wound film along a central line, as a consequence of so-called pressure-sensitization, which means that the places on the film subjected to too high a pressure show these pressure marks after development of the film in the form of spots or streak(s) of increased optical density.

According to a particular embodiment of the invention, the described defect is overcome by giving the hub a design that comprises an outer cylindrical portion which is connected via a central radial web to an inner cylindrical portion.

Shrinkage of the web during the cooling down of the moulded hub causes the central strip portion of the outer cylindrical periphery of the hub to slightly reduce in diameter, whereby occasional protruberances along that strip are retracted inside the general periphery of the hub.

For similar reasons of simplified moulding, it is preferred that the insert is an integral plastics moulding, and that the insert is free from undercuts in opposed mould-release directions, which directions may, of course, be different from those of the hub mold, i.e., not axial.

Advantageously, the insert is provided with cooperating detent means for snap-fit or locking engagement within said channel for resisting relative axial movement between the hub and the insert after once being fitted in place. This makes it very easy to ensure easy insertion and retention of the insert.

Preferably, the insert is provided with two projections for engaging opposite marginal perforations of a film web. This promotes a secure retention of the film web against circumferential slippage.

It is preferred that the film receiving slot defined by the insert and the channel has a width which increases or flares slightly towards the mouth of the slot. This facilitates insertion of the film end into the slot for retention, and also its release on completion of its unwinding.

BRIEF DESCRIPTION OF THE DRAWINGS

A preferred embodiment of the invention will now be described in greater detail with reference to the accompanying diagrammatic drawings in which.

Figure 1:
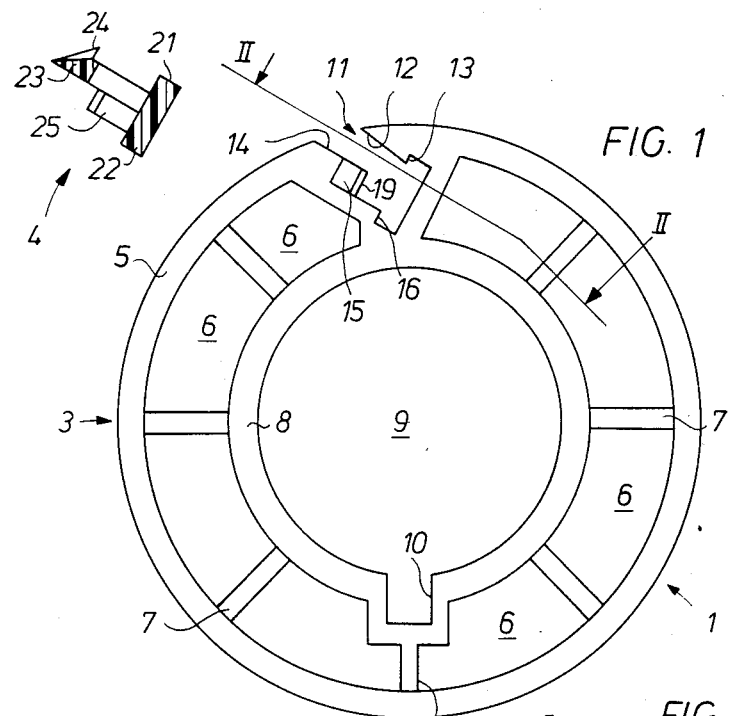
FIG. 1 is an axial view of a photographic film winding core in accordance with the invention comprising a hub and a separate insert, the latter being shown in cross-section along the line I—I of FIG. 3.
Figure 3:
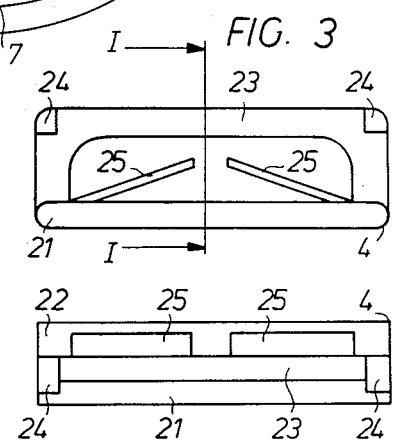
FIGS. 3 and 4 are respectively top plan and front (outside) elevation views of the insert of FIG. 1.
Figure 4:
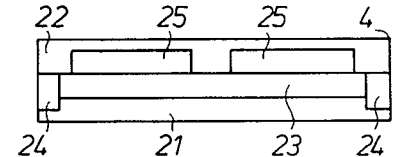

In the drawings, a cylindrical core 1 for receiving windings of a photographic film web 2 (FIG. 5) comprises an integrally moulded hub 3 and a separate integrally moulded insert 4.

The hub comprises an outer cylindrical portion 5 (FIG. 1) which is connected via a central radial web 6 and reinforcing ribs 7 to an inner portion 8. In the embodiment illustrated, the inner portion 8 of the hub 3 defines a circular hole 9 with an optional rectangular keyway 10 for locating the hub 3 on an axle (not shown). In a variant (not shown), the inner hub portion 8 defines a square hole for receiving an axle.

Figure 5:
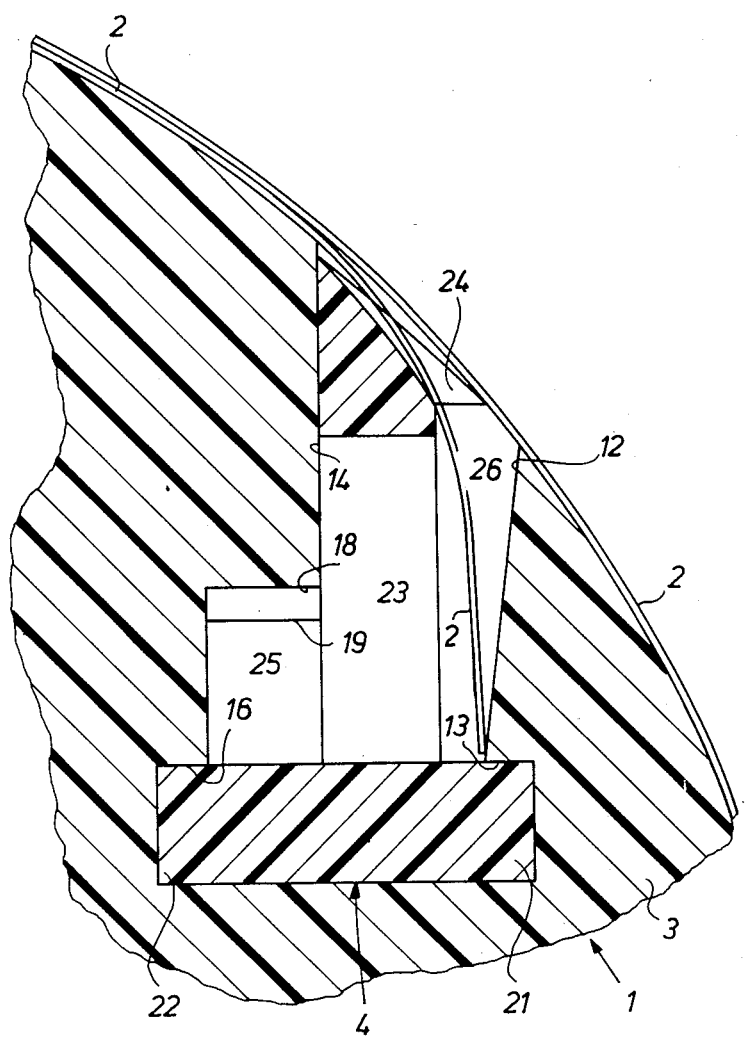
FIG. 5 is a detail cross-sectional view to an enlarged scale of the core of FIG. 1 assembled and carrying a film web.

The hub 3 has an axial re-entrant channel 11 formed in its outer cylindrical portion 5 and radial web 6, that channel being formed to open outwardly in a chordal direction. In FIGS. 1 and 5, the channel 11 has an upper wall 12 which is undercut to provide a shoulder 13, and a lower wall 14 which is undercut to provide two shoulders respectively 15 and 16. The lower channel wall 14 is shown in top plan in FIG. 2, from which it will be seen that first shoulder 15 is shaped symmetrically about its centre to provide outer downwardly (inwardly) inclined portions 17, medial horizontal portions 18 and a central downwardly (inwardly) projecting tongue portion 19 bounded by edges 20.

The integrally moulded insert 4 is shaped to fit into the channel 11 by axial insertion.

The insert 4 has a base plate defining top and bottom flanges 21, 22 which respectively engage the shoulders 13, 16 of the re-entrant of the channel 11 to prevent outward movement of the insert when it has been assembled to the hub 3. Perpendicular to the base plate of the insert 4 is a yoke 23 which carries at its corners barbs 24 projecting to one (top) side of the yoke, which barbs are spaced, shaped and arranged to engage in perforations to be found along the margins of a photographic film web.

Projecting axially inwardly from adjacent the ends of the base plate of the insert 4 on the opposite side of the yoke 23 to the barbs 24 are two outwardly inclined resilient arms 25 which are spaced apart at their inner ends. On insertion of the insert 4 into the channel 11 of the hub 3, these arms 25 are first pressed down towards the insert base plate as they bear against one of the inclined portions 17 of the shoulder 15 formed in the channel 11. As an end of one of those arms 25 passes beyond the far edge 20 of projecting tongue 19 of that shoulder 15, it will snap up next to the medial shoulder portion 18 remote from the side of insertion. The axial length of the downwardly projecting tongue 19 is arranged to be substantially equal to the separation between the ends of the arms 25 in this condition, with the result that an end of each arm 25 bears against one of the tongue edges 20 and the insert is held against movement relative to the hub in its axial direction.

When the insert 4 is inserted into the hub channel 11, the upper or outer wall 12 of that channel and the insert yoke 23 together define a slot 26 for receiving an end of a film web 2 as shown in FIG. 5. The usual marginal perforations provided on a film web can thus engage the barbs 24 to prevent circumferential slippage of the web 2 as it is wound onto the core 1. Slippage is also prevented during unwinding. When the final turn of the film web peels away from the core and the film extends radially away from the core periphery under winding tension, the web lifts from the barbs 24 due to the oblique inclination of the slot and may bear briefly against the upper wall 12 bounding the slot 26 before the end of the film web is released from the core. The slot 26 widens towards its mouth, so as to provide sufficient clearance between the wall 12 and the barbs 24 to facilitate this release.

The hub 3 and insert 4 are each constituted as an integral moulding of plastic material. Due to the design of the hub, it is free from undercuts, i.e., surfaces recessed below outwardly situated surfaces, relative to the joint of the mold, in opposed axial mould-release directions since the mold parts meet or join midway of tongue 19, and it can thus be moulded easily in a two-part moulding die. The insert 4 is also free from undercuts in opposed mould-release directions which in this case are tranverse not axial, and it too can be moulded easily in a two-part moulding die. This affords considerable benefits in tooling costs, and is also beneficial for the life of the moulding die.

Figure 2:
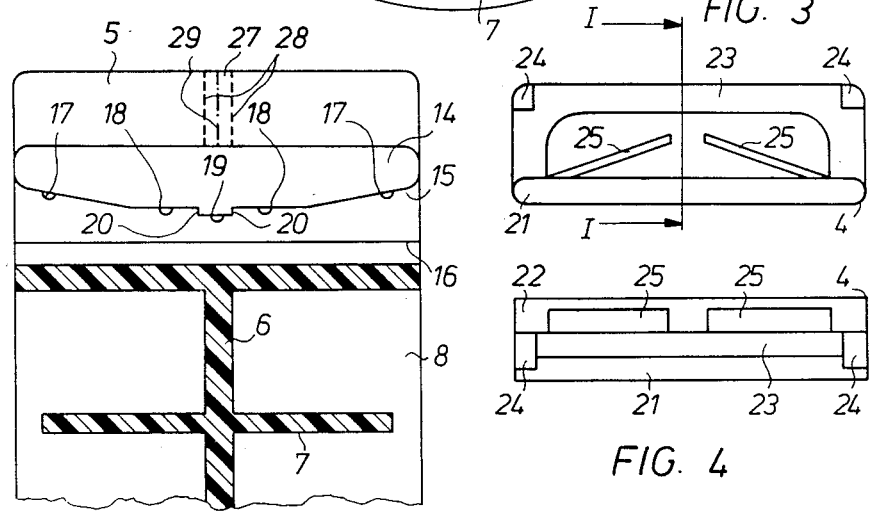
FIG. 2 is a partially cross-section of the hub of FIG. 1 along the lines II—II.

According to a particular feature of the present invention, the interior web 6 of the core operates to cause the radical shrinking of a limited central zone 27 of the outer cylindrical periphery of the hub. The lateral limits of such zone 27, see FIG. 2, are indicated by the broken lines 28, and the axial dimension of such zone will generally be slightly greater than the axial thickness of the web 6. Due to the radial shrinking of the peripheral zone 27, any tiny peripheral flashing-like bead which may result from an imperfect closure of the moulding die parts, and which is illustrated by dash-and-dot line 29, to becomes retracted radially inside the general outer periphery of the hub whereby an increased local pressure on a wound film is avoided.

The magnitude of the radial shrinking described hereinbefore depends on the type of plastic used for the moulding, the axial thickness of the web 6 as compared with the radial wall thickness of the cylindrical outer and inner hub portions, etc., and it should be determined on an empirical basis. This control feature may entail other deformations of the hub which are not desired and therefore should be applied with care.

Good results have been obtained for a standard 35-mm filmcore, with web axial thicknesses situated between 2.5 and 4.5 mm for cylindrical hub portions 5 and 8 having a radial thickness of 2.5 mm.

The core in accordance with the present invention may be made in a size suitable for receiving a film web of any required nominal width, for example the core may be made to any of the sizes specified in American National Standard ANSI PH 1.13-1979 or Draft American National Standard PH 22.37.

The core may be made in any suitable plastic material, such as polystyrene, polyamide, high density polyethylene, etc., reinforced as the case may be with carbon or glass fibers.

We claim:

1. A cylindrical core for receiving windings of a photographic film web equipped with a peripheral opening for receiving an end of the film web and means for resisting circumferential slippage of a wound film web over the core, wherein said core (1) comprises a hub (3) having an axially extending re-entrant channel (11), an elongated insert (4) fitting into said channel (11) and engaged therein to define with the channel (11) a slot (26) for receiving an end of a film web (2), cooperating detent means (19), (25) for resisting relative axial movement between the hub (3) and the insert (4) when the latter is fitted into said channel (11), the insert (4) incorporating means (24) projecting into said slot for engaging at least one marginal perforation of said film web end to prevent circumferential slippage of the film web (2) and being disposed so as to disengage from such film web perforations when the film web extends radially of the hub periphery on unwinding.

2. A film core according to claim 1, wherein said hub (3) is an integral plastic moulding.

3. A film core according to claim 2, wherein said hub (3) is free from undercuts in opposed axial mould-release directions.

4. A film core according to claim 1, wherein the hub (3) comprises an outer cylindrical portion (5) which is connected via a central radial web (6) to an inner portion (8), the thickness of the radial web controlling the radial shrinkage of 9 central portion of the outer cylindrical periphery of the hub.

5. A cylindrical core according to claim 4, wherein the axial wall thickness of the central radial web (6) is larger than the radial wall thickness of the outer cylindrical portion (5).

6. A film core according to claim 4, wherein said insert (4) is free from undercuts in opposed mould-release directions.

7. A film core according to claim 1, wherein said insert (4) is an integral plastic moulding.

8. A film core according to claim 1, wherein said cooperating detent means comprises resilient tongues (25) for snap-fit engagement with a tongue within said channel (11) for resisting relative axial movement between the hub and the insert.

9. A film core according to claim 1, wherein the insert (4) is provided adjacent each of its opposite axial ends with a projection for engaging opposite marginal perforations of a film web (2).

10. A film core according to claim 1 wherein the film receiving slot (26) defined by the insert (4) and the channel (11) has a width which increases towards the mouth of the slot.

11. The film-winding core of claim 1, wherein said slot is defined between outer and inner walls which diverge toward the slot mouth to facilitate release of the film perforations from said teeth.

12. The film winding core of claim 11, wherein said slot is closed at its inner end by a bottom wall.

13. The film-winding core of claim 12, wherein the outer and inner slot-defining walls are planar and the distance separating them is small compared to the depth of the slot from its mouth to said bottom wall.

* * * * *

UNITED STATES PATENT AND TRADEMARK OFFICE
CERTIFICATE OF CORRECTION

PATENT NO. : 4,901,936

DATED : February 20, 1990

INVENTOR(S) : EDWARD BUELENS et al.

It is certified that error appears in the above-identified patent and that said Letters Patent is hereby corrected as shown below:

IN THE CLAIMS:

Column 6, paragraph 4, line 5, before "central" change "9" to --a--.

Signed and Sealed this

Eighteenth Day of December, 1990

Attest:

HARRY F. MANBECK, JR.

*Attesting Officer*   *Commissioner of Patents and Trademarks*